US010954408B2

(12) United States Patent
Moyano et al.

(10) Patent No.: US 10,954,408 B2
(45) Date of Patent: *Mar. 23, 2021

(54) CURABLE FILM-FORMING COMPOSITIONS PREPARED FROM MULTIPLE HYDROPHOBIC POLYMERS AND METHOD OF MITIGATING DIRT BUILD-UP ON A SUBSTRATE

(71) Applicant: PPG INDUSTRIES OHIO, INC., Cleveland, OH (US)

(72) Inventors: Daniel F. Moyano, Allison Park, PA (US); Shanti Swarup, Allison Park, PA (US); Matthew S. Luchansky, Wexford, PA (US); Caitlin Ehmann, Turtle Creek, PA (US); Xiangling Xu, Allison Park, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 39 days.

This patent is subject to a terminal disclaimer.

(21) Appl. No.: 16/038,494

(22) Filed: Jul. 18, 2018

(65) Prior Publication Data
US 2020/0024472 A1 Jan. 23, 2020

(51) Int. Cl.
*C09D 133/10* (2006.01)

(52) U.S. Cl.
CPC .................. *C09D 133/10* (2013.01)

(58) Field of Classification Search
CPC ............... C09D 133/08; C09D 133/10; C08G 18/4063; C08G 18/61
See application file for complete search history.

(56) References Cited

U.S. PATENT DOCUMENTS 5,798,409 A * 8/1998 Ho .................. C08G 18/10
524/506
5,948,851 A * 9/1999 Anton ............. C08G 18/6275
524/520

(Continued)

FOREIGN PATENT DOCUMENTS

EP 2785758 B1 10/2015
WO 9927025 6/1999

(Continued)

*Primary Examiner* — Michael M Dollinger
(74) *Attorney, Agent, or Firm* — Krisanne Shideler (57) ABSTRACT

The present invention is directed to curable film-forming compositions comprising a first film-forming polymer prepared from at least one hydrophobic monomer, a second film-forming polymer prepared from at least one hydrophobic monomer, and a curing agent. Upon application of the curable film-forming composition to a substrate to form a coating layer, the first film-forming polymer is distributed throughout the coating layer, and the concentration of the second film-forming polymer is greater at the surface of the coating layer than the concentration of the second film-forming polymer within the bulk of the coating layer. The invention is additionally drawn to substrates coated with the curable film-forming composition. The present invention is also drawn to methods of mitigating dirt build-up on a substrate, comprising applying to at least a portion of the substrate the curable film-forming composition described above and at least partially curing the curable film-forming composition.

14 Claims, 3 Drawing Sheets

(56) References Cited

U.S. PATENT DOCUMENTS

| | | | |
|---|---|---|---|
| 6,184,842 B1 | 2/2001 | Leinweber et al. | |
| 6,369,186 B1 * | 4/2002 | Branland | C08G 18/10 |
| | | | 525/126 |
| 7,342,551 B2 | 3/2008 | King | |
| 8,702,135 B2 | 4/2014 | Gaboury et al. | |
| 8,785,556 B2 | 7/2014 | Brown | |
| 9,187,670 B1 | 11/2015 | Schwendeman et al. | |
| 9,190,709 B2 | 11/2015 | Grice et al. | |
| 9,334,404 B2 | 5/2016 | Simpson et al. | |
| 9,429,533 B2 | 8/2016 | Larson-Smith et al. | |
| 9,574,089 B2 | 2/2017 | Klein | |
| 9,735,466 B2 | 8/2017 | Johnson et al. | |
| 2010/0069551 A1 * | 3/2010 | Minge | C08F 283/124 |
| | | | 524/406 |
| 2011/0082254 A1 | 4/2011 | Sepeur et al. | |
| 2013/0089731 A1 * | 4/2013 | Imanaka | B05D 1/36 |
| | | | 428/336 |
| 2014/0364542 A1 | 12/2014 | Flosbach et al. | |
| 2015/0240085 A1 * | 8/2015 | Klein | C09D 133/16 |
| | | | 416/241 R |
| 2015/0353663 A1 * | 12/2015 | Liu | A61K 8/8182 |
| | | | 424/60 |
| 2016/0258168 A1 * | 9/2016 | Lee | C08J 5/047 |
| 2017/0355875 A1 | 12/2017 | Klein et al. | |
| 2017/0355876 A1 | 12/2017 | Klein et al. | |

FOREIGN PATENT DOCUMENTS

| | | |
|---|---|---|
| WO | WO 2013/081815 A1 | 6/2013 |
| WO | WO 2013/081816 A1 | 6/2013 |
| WO | WO 2013/081892 A1 | 6/2013 |
| WO | WO 2017/202692 | 11/2017 |

* cited by examiner

CURABLE FILM-FORMING COMPOSITIONS PREPARED FROM MULTIPLE HYDROPHOBIC POLYMERS AND METHOD OF MITIGATING DIRT BUILD-UP ON A SUBSTRATE

FIELD OF THE INVENTION

The present invention relates to curable film-forming compositions prepared from hydrophobic polymers, and methods of mitigating dirt build-up on substrates.

BACKGROUND OF THE INVENTION

Easy cleaning of coated surfaces is a significant selling point for many industries, in both consumer and industrial markets. Easy removal of dirt and prevention of dirt build-up are desirable properties for products such as automobiles. Environmental contaminants such as tar, asphalt, animal droppings, road salt, detergents, and the like may damage the surface of coated vehicles, architectural surfaces, and other industrial substrates. Damage may be caused by a chemical reaction of the contaminant with the coated surface such as by chemical etching, or may involve physical removal of part or all of the coating from the substrate (i. e., "cohesive failure") upon removal of the contaminant during cleaning. Cohesive failure may also involve incomplete removal of the contaminant from the coated surface during cleaning.

The use of hydrophobic acrylates as additives has been the main approach to yield easy-to-clean "E2C" coatings such as automotive clearcoats. However, incompatibility of conventional film-forming binders, which tend to be hydrophilic, and the hydrophobic additives limits the applicability of this approach, because stratification of the materials upon application to a substrate leads to irregular distribution of the hydrophobic additive as well as an undesirable increase of haze. Additionally, short duration of the dirt mitigation properties of current E2C compositions, due to poor durability, has limited their use.

It would be desirable to provide coating compositions that may be used in methods of mitigating dirt build-up on a substrate in order to overcome the disadvantages of the prior art.

SUMMARY OF THE INVENTION

The present invention is directed to curable film-forming compositions comprising:

(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;

(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and (c) a curing agent comprising functional groups reactive with the reactive functional groups in (a). Upon application of the curable film-forming composition to a substrate to form a coating layer, the first film-forming polymer (a) is distributed throughout the coating layer, and the concentration of the second film-forming polymer (b) is greater at the surface region of the coating layer than it is within the bulk region of the coating layer. The present invention is further directed to coated substrates comprising the curable film-forming composition applied to at least one surface of the substrates.

The present invention is also drawn to methods of mitigating dirt build-up on a substrate, comprising:

(1) applying a first coating comprising a pigmented, curable film-forming composition to at least a portion of the substrate to form a base coated substrate;

(2) applying a transparent, curable film-forming composition to at least a portion of the base coated substrate formed in step (1) prior to substantially curing the first coating to form a multi-layer coated substrate, wherein the transparent, curable film-forming composition is prepared from the curable film-forming composition described above; and (3) heating the multi-layer coated substrate formed in step (2) to a temperature and for a time sufficient to cure all the film-forming compositions.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion, such as at least 10 percent, or at least 20 percent, of the reactive groups of the composition occurs, to form a polymerizate. The polymerizable composition can also be subjected to curing conditions such that a substantially complete cure is attained (such as at least 70 percent, or at least 80 percent, or at least 90 percent up to 100 percent, of the reactive groups react) and wherein further curing results in no significant further improvement in polymer properties, such as hardness.

The various embodiments and examples of the present invention as presented herein are each understood to be non-limiting with respect to the scope of the invention.

The first film-forming polymer (a) in the curable film-forming composition of the present invention of the present invention is prepared from at least one hydrophobic monomer and has reactive functional groups. By "polymer" is meant a polymer including homopolymers and copolymers, and oligomers. By "hydrophobic" is meant that the material described as such (e. g., a monomer or polymer) has non-polar properties and has a tendency to interact with, be miscible with, or be dissolved by non-polar solvents such as alkanes and oils. By definition, a molecule may be nonpolar either when there is an equal sharing of electrons between the two atoms of a diatomic molecule or because of the symmetrical arrangement of polar bonds in a more complex molecule, such that there is no overall dipole in the molecule.

The first film-forming polymer is usually an acrylic polymer. The acrylic polymer can be prepared from a reaction mixture comprising a hydrophobic monomer and a monomer having reactive functional groups. Examples of suitable hydrophobic monomers include ethylenically unsaturated monomers such as lauryl (meth)acrylate, stearyl (meth)acrylate, 2-ethylhexyl (meth)acrylate, n-octyl (meth)acrylate, and the like. The term "(meth)acrylate" is meant to encompass acrylate and/or methacrylate molecular structures where they exist. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

The first film-forming polymer (a) often comprises an acrylic polymer prepared from a reaction mixture comprising a hydrophobic monomer, wherein the hydrophobic monomer comprises a fluorinated monomer and/or a siloxane. Suitable hydrophobic monomers comprising siloxane include ethylenically unsaturated monomers comprising polydialkylsiloxane functional groups, usually polydimethylsiloxane functional groups. Such monomers may be prepared, for example, by reacting a polydialkylsiloxane having hydroxyl end groups with an ethylenically unsaturated monomer that has functional groups reactive with hydroxyl groups, such as acid or epoxy functional groups.

Examples of suitable ethylenically unsaturated monomers comprising polydialkylsiloxane functional groups include (meth)acrylate monomers such as X-22-2426 (available from Shin-Etsu Chemical Co), MCR-M07, MCR-M11, MCR-M17, MCR-M22, MCS-M11, MFR-M15 and MFS-M15 (available from Gelest, Inc), FM-0711, FM-0721 and FM-0725 (available from JNC Corporation).

The ethylenically unsaturated monomer comprising polydialkylsiloxane functional groups typically has a weight average molecular weight of 1,000 to 30,000 Da, measured by GPC using polystyrene calibration standards, 2 PL gel MIXED-C as the column, THF as eluent at 1 ml/min and refractive index detector. The polydialkylsiloxane group is typically at least oligomeric, such that the resulting ethylenically unsaturated monomer is often a macromonomer.

The hydrophobic monomer may also (or alternatively) comprise a fluorinated monomer. Nonlimiting examples of suitable ethylenically unsaturated monomers containing fluorine include fluoroethylene, chlorotrifluoroethylene, vinylidene fluoride, and hexafluoropropylene. Other fluorinated monomers include 2,2,3,3,4,4,5,5,6,6,7,7-Dodecafluoroheptyl (meth)acrylate, 3,3,4,4,5,5,6,6,7,7,8,8,9,9,10,10,11,11,12,12,12-Heneicosafluorododecyl (meth)acrylate, 3,3,4,4,5,5,6,6,7,7,8,8,9,9,10,10,10-Heptadecafluorodecyl (meth)acrylate, 2,2,3,3,4,4,4-Heptafluorobutyl (meth)acrylate, 2,2,3,4,4,4-Hexafluorobutyl (meth)acrylate, 1,1,1,3,3,3-Hexafluoroisopropyl (meth)acrylate, 2,2,3,3,4,4,5,5-Octafluoropentyl (meth)acrylate, 2,2,3,3,3-Pentafluoropropyl (meth)acrylate, 1H,1H,2H,2H-Perfluorodecyl (meth)acrylate, 2,2,3,3-Tetrafluoropropyl (meth)acrylate, 3,3,4,4,5,5,6,6,7,7,8,8,8-Tridecafluorooctyl (meth)acrylate, 2,2,2-Trifluoroethyl (meth)acrylate, and 2-[(1',1',1'-Trifluoro-2'-(trifluoromethyl)-2'-hydroxy)propyl]-3-norbornyl (meth)acrylate.

The first film-forming polymer has reactive functional groups. The term "reactive" refers to a functional group capable of undergoing a chemical reaction with itself and/or other functional groups spontaneously or upon the application of heat or in the presence of a catalyst or by any other means known to those skilled in the art. The functional groups on the first film-forming binder may be selected from at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, acrylate, maleic and mercaptan groups. The functional groups on the film-forming polymer are often selected so as to be reactive with those on the curing agent (c). The reactive functional groups on the first film-forming polymer are usually active hydrogen groups such as hydroxyl, carboxyl, carbamate, primary and/or secondary amine, amide, thiol, and the like as known to those skilled in the art.

Useful hydroxyl functional ethylenically unsaturated monomers include hydroxyalkyl (meth)acrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl (meth)acrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl (meth) acrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl (meth)acrylate is preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. (Note that these acid functional monomers may also be used in the reaction mixture to prepare the first film-forming polymer, providing acid functional reactive groups thereto.) The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 7 to 30 carbon atoms, such as butyl glycidyl ether, octyl glycidyl ether, phenyl glycidyl ether and para-(tertiary butyl) phenyl glycidyl ether. Commonly used glycidyl esters include those of the structure:

where R is a hydrocarbon radical containing from about 4 to about 26 carbon atoms. Preferably, R is a branched hydrocarbon group having from about 8 to about 10 carbon atoms, such as neopentyl, neoheptanyl or neodecanyl. Suitable glycidyl esters of carboxylic acids include VERSATIC ACID 911 and CARDURA E, each of which is commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower aliphatic, cycloaliphatic, and aromatic alcohols (i. e., usually having eight or less carbon atoms) such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

The ethylenically unsaturated monomer comprising reactive functional groups is typically present in the reaction mixture that may be used to prepare the first film-forming polymer in an amount of 1 to 30, such as 1 to 20, or 1 to 10 percent by weight, based on the total weight of monomers in the reaction mixture.

One or more other polymerizable ethylenically unsaturated monomers may be included in the reaction mixture that may be used to prepare the first film-forming polymer. Useful alkyl esters of acrylic acid or methacrylic acid include aliphatic alkyl esters containing from 1 to 30, and preferably 4 to 18 carbon atoms in the alkyl group. Non-limiting examples include methyl (meth)acrylate, ethyl (meth)acrylate, and butyl (meth)acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Styrene is often used.

When used, these additional ethylenically unsaturated monomers are typically present in the reaction mixture used to prepare the acrylic polymer in an amount of 5 to 50, more often 10 to 30 percent by weight, based on the total weight of monomers in the reaction mixture.

The first film-forming polymer (a) may be prepared using known addition polymerization techniques, such as organic solution polymerization techniques, in particular from the afore-mentioned reaction mixtures. Exemplary methods are illustrated in the examples below.

The curable film-forming compositions of the present invention further comprise (b) a second film-forming polymer prepared from at least one hydrophobic monomer. The second film-forming polymer may be prepared from any of the monomers listed above used to prepare the first film-forming polymer. The second film-forming polymer may also have reactive functional groups such as any of those described above. In a particular example of the present invention, the second film-forming polymer (b) comprises an acrylic polymer prepared from a reaction mixture comprising a hydrophobic monomer and a monomer having a functional group reactive with the functional groups on the curing agent (c), wherein the hydrophobic monomer comprises a fluorinated monomer and/or a siloxane. However, the second film-forming polymer (b) is different from the first film-forming polymer (a). Each is prepared using monomers such that upon application of the curable film-forming composition to a substrate to form a coating layer, the first film-forming polymer is distributed throughout the coating layer with respect to a cross-section of the coating layer. That is, the concentration of the first film-forming polymer with respect to the entire coating composition is substantially consistent throughout the coating layer. Additionally, the concentration of the second film-forming polymer is greater at the surface region of the coating layer than the concentration of the second film-forming polymer within the bulk region of the coating layer. By "surface region" is meant the outermost 10% of the coating layer thickness after the coating composition is applied to a substrate. By "bulk region" is meant the remainder of the coating layer thickness under the surface region. For example, in a coating layer having a dry film thickness (DFT) of 100 microns after curing, the surface region is the outermost 10 microns of the coating layer. Thus the mass ratio of the second film-forming polymer to the first film-forming polymer is greater in the surface region of the coating layer than in the bulk of the coating layer. These distribution phenomena of the two polymers may be attained by preparing the respective film-forming polymers so that the second film-forming polymer (b) is more hydrophobic than the first film-forming polymer (a). This may be accomplished by using a higher amount of hydrophobic monomers in the preparation of the second film-forming polymer than in the first film-forming polymer. For example, in the preparation of the first film-forming polymer (a), the hydrophobic monomer is typically present in the reaction mixture in an amount of 4 to 15 percent by weight, such as 5 to 13 percent by weight, based on the total weight of monomers in the reaction mixture. In contrast, in the preparation of the second film-forming polymer (b), the hydrophobic monomer is typically present in the reaction mixture in an amount of 15 to 60 percent by weight, such as 20 to 50 percent by weight or 20 to 40 percent by weight, based on the total weight of monomers in the reaction mixture.

In addition, the amount of each polymer in the curable film-forming composition is different. Typically the first film-forming polymer (a) is present in the curable film-forming composition in an amount of at least 20 percent by weight, or at least 25 percent by weight, or at least 30 percent by weight, and at most 40 percent by weight, or at most 35 percent by weight, based on the total weight of resin solids in the curable film-forming composition. The second film-forming polymer (b) is present in the curable film-forming composition in an amount of at least 0.5 percent by weight, such as at least 1 percent by weight, and at most 15 percent by weight, or at most 10 percent by weight, based on the total weight of resin solids in the curable film-forming composition. While not intending to be bound by theory, it is believed that the distributions of the first and second film-forming polymers in a coating layer allow for an extended duration of dirt mitigation properties of the coating layer compared to coating layers that do not have such a distribution of polymers of varying hydrophobicity.

The curable film-forming compositions of the present invention further comprise (c) a curing agent comprising functional groups that are reactive with the reactive functional groups in the polymer (a) and with the reactive functional groups in the polymer (b) when they are present.

The curing agent (c) used in the curable film-forming composition may be selected from one or more polyisocyanates such as diisocyanates and triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and $\alpha,\alpha,\alpha',\alpha'$-tetramethylmeta-xylylene diisocyanate.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3390, which is the isocyanurate of hexamethylene diisocyanate, available from Bayer Corporation. Specifically used polyisocyanates are trimers of diisocyanates such as hexamethylene diisocyanate and isophorone diisocyanate. Desmodur Z 4470 BA, an aliphatic polyisocyanate based on isophorone diisocyanate available from Bayer Corporation, is also suitable.

The polyisocyanate may also be one of those disclosed above, chain extended with one or more polyamines and/or polyols using suitable materials and techniques known to those skilled in the art to form a polyurethane prepolymer having isocyanate functional groups.

Mixtures of aliphatic polyisocyanates are particularly suitable.

The curing agent (c) used in the curable film-forming composition may alternatively or additionally be selected from one or more aminoplast resins. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541.

The aminoplast resins often contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Many aminoplast resins are partially alkylated with methanol or butanol.

The curing agent (c) is typically present in the film-forming compositions in an amount ranging from 30 to 79.5 percent by weight, such as 40 to 65 percent by weight, often 45 to 60 percent by weight, based on the total weight of resin solids in the composition.

The curable film-forming composition of the present invention may further comprise (d) an additional film-forming resin component different from the first and second film-forming polymers (a) and (b) and having functional groups that are reactive with at least one other component of the curable film-forming composition. Such a component (d) may comprise one or more film-forming polymers and/or curing agents.

The additional film-forming resin component (d) may comprise an addition (such as an acrylic) polymer, polyester polymer, polyurethane polymer, polyether polymer, polyester acrylate, and/or polyurethane acrylate. Often an acrylic polymer and/or polyester polymer having multiple hydroxyl functional groups is used.

Suitable acrylic polymers include copolymers of one or more monomers such as any of those disclosed above.

A polyester polymer may also be used in the additional film-forming resin component (d). Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyesters derived from cyclic esters such as caprolactone are also suitable. Polyester acrylates, such as acrylic polymers having polyester side chains, may also be used.

Polyurethanes can also be used in the additional film-forming resin component (d). Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Any of those disclosed above may be used in the preparation of the polyurethane. Polyurethane acrylates, such as acrylic polymers having polyurethane side chains, may also be used.

Examples of polyether polyols are polyalkylene ether polyols which include those having the following structural formula:

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxyethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers include polyoxypropylene amines such as those commercially available under the trademark designation JEFFAMINE®; amine functional acrylic polymers and polyester polymers prepared as known in the art are also suitable.

The additional film-forming resin component (d) may include an aminoplast such as any of those disclosed above. In a particular example of the present invention, the additional film-forming resin component (d) comprises an acrylic and/or polyester polyol and an aminoplast.

When used, the additional film-forming resin component (d) is typically present in the film-forming compositions in an amount ranging from 30 to 49.5 percent by weight, often 35 to 45 percent by weight, based on the total weight of resin solids in the composition.

The film-forming composition can additionally include a variety of optional ingredients and/or additives that are somewhat dependent on the particular application of the curable composition, such as other curing catalysts, pigments or other colorants, reinforcements, thixotropes, accelerators, surfactants, plasticizers, extenders, stabilizers, corrosion inhibitors, diluents, hindered amine light stabilizers, UV light absorbers, adhesion promoters, and antioxidants. The curable film-forming composition may be a color coat or clear coat; it may be opaque (less than 10% visible light transmittance), translucent (10 to 70% visible light transmittance), tinted transparent, or colorless transparent. The term "transparent", as used for example in connection with a substrate, film, material and/or coating, means that the indicated substrate, coating, film and/or material has the property of transmitting visible light without appreciable scattering so that objects lying beyond are entirely visible.

As used herein, transparent articles demonstrate a visible light transmittance of at least 70%, such as at least 75% or at least 80%. To test transmission, a test panel may be mounted between electromagnetic radiation transmitter and receiver antennas. If the test panel is coated, the coated side of the substrate faces the transmitter. The insertion loss (IL) is measured and refers to the amount of transmitted signal that is not detected at the receiver. This method assumes a "lossless" condition in which the substrate either does not absorb or absorbs an insignificant amount of the incident radar frequency. The % Transmission may be calculated according to Equation 1.

$$\% \text{ Transmission} = 100 \times 10^{IL/10} \qquad \text{Equation 1}$$

The curable compositions used in the present invention can be prepared as a two-package composition, often curable at ambient temperature. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). Two-package curable compositions are typically prepared by combining the ingredients immediately before use. The curable film-forming compositions may alternatively be prepared as one-package systems.

The present invention is further drawn to a coated substrate, comprising the curable film-forming composition described above, applied to at least one surface of the substrate.

Suitable substrates include metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The curable film-forming compositions may also be applied over elastomeric, plastic, or composite substrates such as those that are found on motor vehicles and used as vehicle components such as wheels, bumpers, fenders, hoods, doors, panels, etc. These vehicle parts may be formed from any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers. When the substrate is an elastomeric, plastic, or composite substrate, it is often useful to include in the curable film-forming composition a catalyst, since lower cure temperatures than those used for metal substrates may be required to prevent damage to or deformation of the substrate. Curable film-forming compositions containing tin-containing catalysts are particularly suitable for use on plastic substrates that require lower cure temperatures to avoid deformation. Tin-containing catalysts such as triphenyl tin hydroxide, butyl stannoic acid, dioctyltin oxide, dibutyltin dilaurate, dibutyltin diacetate, and dibutyltin oxide are suitable.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical and/or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-25 mils (25.4-635 microns), often 5-25 mils (127-635 microns).

The film-forming compositions can be applied directly to the surface of a substrate or onto a primer coat or other coating as noted above, such as an electrocoat or topcoat, on the substrate to form a coated substrate in accordance with the present invention. Suitable electrocoat compositions include ED 6465; primers include HP78224EH, both commercially available from PPG Industries, Inc. Alternatively, a primer may not be used and the film-forming compositions can be applied directly to a pigmented basecoat or other coating. Multiple coating layers such as an electrocoat and a primer and optionally a colored base coat may be applied to the substrate prior to application of the curable film-forming composition of the present invention. Thus, the present invention is further drawn to a coated substrate comprising: A) a pigmented, curable film-forming composition applied to at least one surface of the substrate to form a base coated substrate, and B) a transparent, curable film-forming composition applied to at least one surface of the base coated substrate, wherein the transparent, curable film-forming composition is prepared from the curable film-forming composition described above.

After forming a film of the coating on the substrate, the composition can be cured by heating to a temperature and for a time sufficient to cure the composition; for example, by allowing it to stand at ambient temperature, or a combination of ambient temperature cure and baking, or by baking alone. The composition may be cured at ambient temperature typically in a period ranging from about 24 hours to about 36 hours. If ambient temperature and baking are utilized in combination, the composition is often allowed to stand ("flash") for a period of from about 2 minutes to about 120 minutes at a temperature ranging from ambient to 175° F.

(79.4° C.), followed by baking at a temperature up to about 300° F. (148.9° C.), usually 285° F. (140.6° C.) for a period of time ranging from about 20 minutes to about 1 hour.

After application of the curable film-forming composition to the substrate and upon curing, the coated substrate demonstrates dirt mitigation properties when subjected to various tests described in the Examples below. Such properties render the curable film-forming compositions of the present invention particularly suitable for use in methods of mitigating dirt build-up on a substrate, in accordance with the present invention.

In the method of the present invention, dirt build-up on a substrate is mitigated by applying to at least a portion of the substrate the curable film-forming composition described above and then at least partially curing the curable film-forming composition. A curable film-forming composition is applied to at least one surface of the substrate. A substrate may have one continuous surface, or two or more surfaces such as two opposing surfaces. Typically the surface that is coated is any that is expected to be exposed to conditions conducive to dirt build-up, such as consumer and industrial vehicles and building structures. By "dirt" is meant soil, grease, oil, minerals, detergent, salt, tar, asphalt, animal droppings, insects ("bug splatter"), tree sap, and the like; contaminants that are commonly found outside or in industrial settings, and that tend to adhere to vehicle surfaces. In a particular example of the present invention, a method of mitigating dirt build up on a substrate is provided, comprising:

(1) applying a first coating comprising a pigmented, curable film-forming composition to at least a portion of the substrate to form a base coated substrate;

(2) applying a transparent, curable film-forming composition to at least a portion of the base coated substrate formed in step (1) prior to substantially curing the first coating to form a multi-layer coated substrate, wherein the transparent, curable film-forming composition is prepared from the curable film-forming composition described above; and (3) heating the multi-layer coated substrate formed in step (2) to a temperature and for a time sufficient to cure all the film-forming compositions.

The methods of the present invention are particularly suitable for the mitigation of dirt build up on a component of a vehicle. Such vehicles may include landcraft such as cars, trucks, sport utility vehicles, motorcycles; watercraft such as boats, ships and submarines; aircraft such as airplanes and helicopters; construction such as construction vehicles; and military such as military vehicles, for example tanks and Humvees.

Each of the embodiments and characteristics described above, and combinations thereof, may be said to be encompassed by the present invention. For example, the present invention is thus drawn to the following nonlimiting aspects:

1. A curable film-forming composition comprising:

(a) a first film-forming polymer prepared from at least one hydrophobic monomer and having reactive functional groups, wherein the first film-forming polymer (a) is present in the curable film-forming composition in an amount of 20 to 40 percent by weight, based on the total weight of resin solids in the curable film-forming composition;

(b) a second film-forming polymer different from the first film-forming polymer (a) and prepared from at least one hydrophobic monomer, wherein the second film-forming polymer (b) is present in the curable film-forming composition in an amount of 0.5 to 15 percent by weight, based on the total weight of resin solids in the curable film-forming composition; and (c) a curing agent comprising functional groups reactive with the reactive functional groups in (a); wherein upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer.

2. The curable film-forming composition according to aspect 1, wherein the second film-forming polymer (b) is more hydrophobic than the first film-forming polymer (a).

3. The curable film-forming composition according to either of aspects 1 or 2, wherein the first film-forming polymer (a) comprises an acrylic polymer prepared from a reaction mixture comprising a hydrophobic monomer, wherein the hydrophobic monomer in the reaction mixture used to prepare the first film-forming polymer (a) comprises a fluorinated monomer and/or a siloxane.

4. The curable film-forming composition according to aspect 3, wherein the hydrophobic monomer in the reaction mixture used to prepare the first film-forming polymer (a) is present in the reaction mixture in an amount of 4 to 15 percent by weight, based on the total weight of monomers in the reaction mixture.

5. The curable film-forming composition according to any of the preceding aspects, wherein the second film-forming polymer (b) comprises an acrylic polymer prepared from a reaction mixture comprising a hydrophobic monomer and a monomer having a functional group reactive with the functional groups on the curing agent (c), wherein the hydrophobic monomer in the reaction mixture used to prepare the second film-forming polymer (b) comprises a fluorinated monomer and/or a siloxane.

6. The curable film-forming composition according to aspect 5, wherein hydrophobic monomer in the reaction mixture used to prepare the second film-forming polymer (b) is present in the reaction mixture in an amount of 15 percent by weight to 60 percent by weight, based on the total weight of monomers in the reaction mixture.

7. The curable film-forming composition according to any of the preceding aspects, wherein the curing agent (c) comprises a polyisocyanate.

8. The curable film-forming composition according to any of the preceding aspects, further comprising (d) an additional film-forming resin component that (i) is different from the first and second film-forming polymers (a) and (b); and (ii) has functional groups that are reactive with at least one other component of the curable film-forming composition.

9. The curable film-forming composition according to aspect 8, wherein the additional film-forming resin component (d) comprises an acrylic and/or polyester polyol and an aminoplast.

10. A coated substrate comprising the curable film-forming composition according to any of the preceding aspects applied to at least one surface of the substrate.

11. The coated substrate according to aspect 10 comprising:

A) a pigmented, curable film-forming composition applied to at least one surface of the substrate to form a base coated substrate, and B) a transparent, curable film-forming composition applied to at least one surface of the base coated substrate, wherein the transparent, curable film-forming composition is prepared from the curable film-forming composition according to any of aspects 1 to 9.

12. The coated substrate according to aspect 10 or 11, wherein the substrate comprises a component of a vehicle.

13. A method of mitigating dirt build-up on a substrate, comprising:

(1) applying a first coating comprising a pigmented, curable film-forming composition to at least a portion of the substrate to form a base coated substrate;

(2) applying a transparent, curable film-forming composition to at least a portion of the base coated substrate formed in step (1) prior to substantially curing the first coating to form a multi-layer coated substrate, wherein the transparent, curable film-forming composition is prepared from the curable film-forming composition according to any of aspects 1 to 9; and (3) heating the multi-layer coated substrate formed in step (2) to cure all the film-forming compositions.

14. The method according to aspect 13, wherein the substrate comprises a component of a vehicle.

The following examples are intended to illustrate various embodiments of the invention, and should not be construed as limiting the invention in any way.

EXAMPLES

The following working examples are intended to further describe the invention. It is understood that the invention described in this specification is not necessarily limited to the examples described in this section.

Example A

A hydrophobic polyol to be used as a first film-forming polymer in the composition of the present invention, containing 4.8 percent by weight PDMS-functional methacrylate monomer, was synthesized by the following procedure. 2331 g amyl acetate was charged into a four-necked round bottom flask fitted with a thermocouple, mechanical stirrer, and condenser and blanketed with $N_2$. The mixture was heated to 150° C. and held for 10 minutes. After that, an initiator mixture of 341 g amyl acetate and 135 g LUPEROX 7M50 (polymerization initiator available from Arkema) was charged into the flask over 4 hours. Simultaneously, a monomer mixture of 407 g butyl methacrylate, 1035 g isobornyl methyacrylate, 635 g 2-hydroxyproyl methacrylate, 574 g hydroxyethyl methacrylate, 453 g butyl acrylate, 195 g KF-2012 silicone fluid available from Shin-Etsu and 87 g amyl acetate was charged into the flask over 3 hours. Directly after charging the above monomer mixture, a second monomer mixture of 136 g butyl methacrylate, 211 g 2-hydroxyproyl methacrylate, 191 g hydroxyethyl methacrylate, 105 g butyl acrylate and 39 g amyl acetate was charged into the flask over 45 minutes. After the initiator mixture charge was complete, the reaction was held at 150° C. for an additional 30 minutes. After that, the system was cooled down to 110° C., and 35 g butyl acrylate was charged into the flask all at once. A mixture of 142 g amyl acetate and 57 g LUPEROX 26 (polymerization initiator available from Arkema) was charged into the flask over 1 hour, followed by holding at 110° C. for 1 hour. The final measured solid content by weight of the above resin is 57.0% with a weight average molecular weight of 6498 g/mol and a number average molecular weight of 2490 g/mol based on gel permeation chromatography using polystyrene standards.

Example B

A hydrophobic polyol to be used as a first film-forming polymer in the composition of the present invention, containing 12.3 percent by weight partially fluorinated methacrylate monomer, was synthesized by the following procedure. 2000 g amyl acetate was charged into a four-necked round bottom flask fitted with a thermocouple, mechanical stirrer, and condenser and blanketed with $N_2$. The mixture was heated to 150° C. and held for 10 minutes. After that, the initiator mixture of 576 g amyl acetate and 228 g LUPEROX 7M50 was charged into the flask over 4 hours. Simultaneously, a monomer mixture of 344 g butyl methacrylate, 874 g isobornyl methyacrylate, 536 g 2-hydroxyproyl methacrylate, 484 g hydroxyethyl methacrylate, 382 g butyl acrylate, 480 g CAPSTONE 62-MA (2-Methyl-2-propenoic acid, 3,3,4,4,5,5,6,6,7,7,8,8-tridecafluorooctyl ester, available from The Chemours Company FC, LLC) and 74 g amyl acetate was charged into the flask over 3 hours. Directly after charging the above monomer mixture, a second monomer mixture of 115 g butyl methacrylate, 179 g 2-hydroxyproyl methacrylate, 161 g hydroxyethyl methacrylate, 89 g butyl acrylate and 33 g amyl acetate was charged into the flask over 45 minutes. After the initiator mixture charge was complete, the reaction was held at 150° C. for additional 30 minutes. After that, the system was cooled down to 110° C., and 60 g butyl acrylate was charged into the flask all at once. A mixture of 240 g amyl acetate and 96 g LUPEROX 26 was charged into the flask over 1 hour, followed by holding at 110° C. for 1 hour. The final measured solid content by weight of the above resin is 52.5% with a weight average molecular weight of 7023 g/mol and a number average molecular weight of 1797 g/mol based on gel permeation chromatography using polystyrene standards.

Example C

A hydrophobic polyol to be used as a first film-forming polymer in the composition of the present invention, containing 12.5 percent by weight single-end carboxyl-modified PDMS was synthesized by the following procedure. 2000 g amyl acetate and 7.0 g ETPB (ethyltriphenyl phosphonium bromide) was charged into a four-necked round bottom flask fitted with a thermocouple, mechanical stirrer, and condenser and blanketed with $N_2$. The mixture was heated to 150° C. and held for 10 minutes. After that, the initiator mixture of 564 g amyl acetate and 223 g LUPEROX 7M50 was charged into the flask over 4 hours. Simultaneously, a monomer mixture of 337 g butyl methacrylate, 856 g isobornyl methyacrylate, 525 g 2-hydroxyproyl methacrylate, 474 g hydroxyethyl methacrylate, 375 g butyl acrylate, 118 g glycidyl methacrylate, 411 g X-22-3710 (reactive silicone fluid available from Shin-Etsu) and 72 g amyl acetate was charged into the flask over 3 hours. Directly after charging the above monomer mixture, a second monomer mixture of 113 g butyl methacrylate, 175 g 2-hydroxyproyl methacrylate, 158 g hydroxyethyl methacrylate, 87 g butyl acrylate, 23.5 g glycidyl methacrylate, and 82 g X-22-3710 was charged into the flask over 45 minutes. After the initiator mixture charge was complete, the reaction was held at 150° C. for an additional 30 minutes. After that, the system was cooled down to 110° C., and 59 g butyl acrylate was charged into the flask all at once. A mixture of 235 g amyl acetate and 94 g LUPEROX 26 was charged into the flask over 1 hour, followed by holding at 110° C. for 1 hour. The final measured solid content by weight of the above resin is 56.0% with a weight average molecular weight of 7440 g/mol and a number average molecular weight of 1882 g/mol based on gel permeation chromatography using polystyrene standards.

Example D

A hydrophobic polyol to be used as a second film-forming polymer in the composition of the present invention, containing 23.0 percent by weight polydimethylsiloxane (PDMS)-functional methacrylate monomer was synthesized by the following procedure. A mixture of 2404 g amyl acetate, 841 g X-22-2426 (reactive silicone fluid available from Shin-Etsu), 534 g isobornyl methacrylate and 147 g 4-hydroxybutyl acrylate were charged into a four-necked round bottom flask fitted with a thermocouple, mechanical stirrer, and condenser and blanketed with $N_2$. The mixture was heated to 135° C. and held for 10 minutes. After that, an initiator mixture of 641 g amyl acetate and 140 g LUPEROX 7M50 was charged into the flask over 3 hours. Simultaneously, a monomer mixture of 1603 g isobornyl methyacrylate and 444 g 4-hydroxybutyl acrylate was charged into the flask over 3 hours. After that, the reaction was held at 135° C. for an additional 30 minutes. Then, a mixture of 320 g amyl acetate and 32 g LUPEROX 26 was charged into the flask over 1 hour, followed by holding at 135° C. for 1 hour. The final measured solid content by weight of the above resin is 49.4% with a weight average molecular weight of 8300 g/mol and a number average molecular weight of 1100 g/mol based on gel permeation chromatography using polystyrene standards.

Formulation Examples

A coating layer comprising a waterborne basecoat system (available from PPG as JetBlack, code BIPCU668) was applied over a 4-inch by 12-inch cold-rolled steel substrate panel pre-coated with electrocoat and a primer (HP78224EH primed substrate panels available in pre-coated form from ACT Test Panels LLC). The coating layers were applied under controlled conditions of 20-22° C. temperature and 60-65% relative humidity using conventional spray equipment (SPRAYMATION, available from Spraymation, Inc). The coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (both coating layers) after dehydrating was approximately 15-20 micrometers.

Premix A was prepared by mixing the components listed in Table 1 under agitation in the listed order.

TABLE 1

| Components | Parts by weight |
| --- | --- |
| n-Amyl Acetate | 23.3 |
| SOLVESSO 100[1] | 13.7 |
| Diethylene Glycol n-butyl Ether Acetate | 9.0 |
| TINUVIN 928[2] | 2.0 |
| TINUVIN 292[3] | 3.2 |
| Melamine[4] | 7.1 |
| Polysiloxane polyol silica[5] | 4.1 |
| Flow/anti-popping additive[6] | 0.05 |

[1]Blend of aromatic solvents available from ExxonMobil Corporation
[2]2-(2H-Benzotriazol-2yl)-6-(1-methyl-1-phenylethyl)-4-(1,1,3,3-tetramethylbutyl)phenol UV absorber available from Ciba Specialty Chemicals Corp.
[3]Hindered amine light stabilizer available from Ciba-Geigy Corp.
[4]Highly butylated melamine (CYMEL ® 1156 available from Allnex)
[5]Silica dispersion prepared as follows: a 4-neck reaction flask equipped for vacuum distillation was flushed with $N_2$. To the reaction flask was added 1051.1 parts-by-weight of a siloxane polyol, 1125.8 parts-by-weight of ORGANOSILICASOL MT-ST-M (colloidal silica from Nissan Chemicals), and 480.3 parts-by-weight of methyl amyl ketone. The resulting mixture was vacuum distilled at 25° C. for 4 hours. The siloxane polyol was prepared beforehand by reacting 131.54 parts-by-weight of trimethylolpropane monoallyl ether and 93.21 parts-by-weight of MASILWAX BASE (a polysiloxane-containing silicon hydride available from BASF Corporation).
[6]Polyacrylate surface additive (BYK-390 by BYK) in butyl acetate The experimental clearcoat compositions comprise the components listed in Table 2. Clearcoat compositions (both experimental and control formulas) were each separately applied over the dehydrated basecoat system to form a third wet coating layer on each of the substrate panels. Control 1 contains no hydrophobic film-forming polymers. Control 2 contains a hydrophobic polyol corresponding to the second film-forming polymer (b) in the curable film-forming composition of the present invention, but no polymer corresponding to the first film-forming polymer (a). Control 3 contains a hydrophobic polyol corresponding to the first film-forming polymer (a) in the curable film-forming composition of the present invention, but no polymer corresponding to the second film-forming polymer (b).

TABLE 2

| Component | Example 1 | Example 2 | Example 3 | Control 1 | Control 2 | Control 3 |
| --- | --- | --- | --- | --- | --- | --- |
| Premix A | 62.9 | 62.9 | 62.9 | 62.9 | 62.9 | 62.9 |
| Hydrophobic polyol of Example D | 20.5 | 20.5 | 20.5 | 0 | 10.3 | 0 |
| Hydrophobic polyol of Example A | 54.1 | 0 | 0 | 0 | 0 | 55.6 |
| Hydrophobic polyol of Example B | 0 | 57.8 | 0 | 0 | 0 | 0 |
| Hydrophobic polyol of Example C | 0 | 0 | 55.0 | 0 | 0 | 0 |
| Acrylic polyol[1] | 26.0 | 23.5 | 23.5 | 74.8 | 74.8 | 26.8 |
| Crosslinker[2] | 34.6 | 38.1 | 38.1 | 40.6 | 40.6 | 43.7 |

[1]14.5 percent by weight BMA; 14.5 percent by weight BA; 20 percent by weight HEMA; 29 percent by weight IBOMA; 22 percent by weight HPMA at 53% weight solids in aromatic hydrocarbon mixture.
[2]A mixture of 1.6 parts by weight DESMODUR N-3300A (a 100% solids hexamethylene diisocyanate (HDI) trimer (isocyanurate ring) available from Covestro LLC) and 1 part by weight DESMODUR Z 44700 (a 70% solids isophorone diisocyanate (IPDI) trimer (isocyanurate ring) available from Covestro LLC).

The clearcoat layers were sprayed over the dehydrated basecoat system on the substrate panels using SPRAYMATION equipment. The clearcoat layers were sprayed in two consecutive coats without any intermediate drying between spray applications. The clearcoat layers were then allowed to dry for 7 minutes under ambient conditions and thereafter the multi-layer coatings were baked for 30 minutes at 140° C. The dry film thicknesses of the clearcoat layers after cure were approximately 50-51 micrometers.

The initial dirt mitigation properties of the coatings of Example 1 relative to a comparative 2K urethane coating (CeramiClear 5.3, commercially available from PPG) were evaluated using different types of dirt and evaluating the easiness of removal as follows: 1) panel is wiped gently with isopropanol; 2) using a plastic pipette dispense 0.5 mL of either a dispersion of road tar (3:1 in water), tree sap, a dispersion of micronized silica (5:1 in water), or a dispersion of soil (3:1 in water), adding multiple drops over a specific area for repeatability; 3) put the panel in a horizontal position in an oven at 120° F. (48° C.) for 1 hour for dehydration; 4) remove the panels from the oven and let them reach room temperature; 5) using a paper towel, try to remove the dirt by either doing double rubs (count) or picking up the dirt and rating the difficulty of removal; for bug splatter, use an air gun to propel the bugs on the panel in step 3, and use the same procedure as with the other types of dirt. The results can be seen in TABLE 3 (Initial contact angle for Example 1 is 105°, while Control is 90°).

Likewise, the susceptibility to dirt pickup in a dusty harsh environment was evaluated by visually observing the amount of dirt that adheres to the surface during outdoor exposure in Sunrise, Fla. The results can also be seen in TABLE 3.

TABLE 3

| Test | Control | Example 1 |
| --- | --- | --- |
| Mud (soil) | 9 | 10 |
| Tree Sap | 2 | 10 |
| Bug Splatter | 5 | 10 |
| Road Tar | 1 | 10 |
| Dirt Pickup** | 3 | 8 |
| Bug Splatter (no cleaning)* | 1 | 8 |

Ranking from 1 to 10 (1 = Worst, 10 = Best) of easiness of dirt removal.
**Dirt pickup was an observation of the amount of dirt accumulated on top of the panel after field exposure for 3 months.
*Value denotes the amount of bug splatter at surface of the panel before cleaning with paper towel - Bug splatter pick up.

Note: Panels coated with the composition of the present invention, after applying dirt but before cleaning, showed increased bug repellency; panels after cleaning with a dry cloth demonstrated improved dirt mitigation properties of the composition of the present invention compared to a composition that does not contain a first and second hydrophobic polymer. Additionally, dirt mitigation properties of Example 1 were improved and showed reduced dirt pickup relative to a comparative 2K urethane clearcoat after field exposure (in Sunrise, Fla.) for 3 summer months (panels had not been cleaned).

The retention of hydrophobic properties (as evaluated by water contact angle) of the composition of Example 1 and the composition of Control 2 was evaluated by QUV chamber (340 nm) and by natural exposure to harsh environmental conditions (high humidity, high temperature, direct sun exposure) in Florida.

Figure 1:
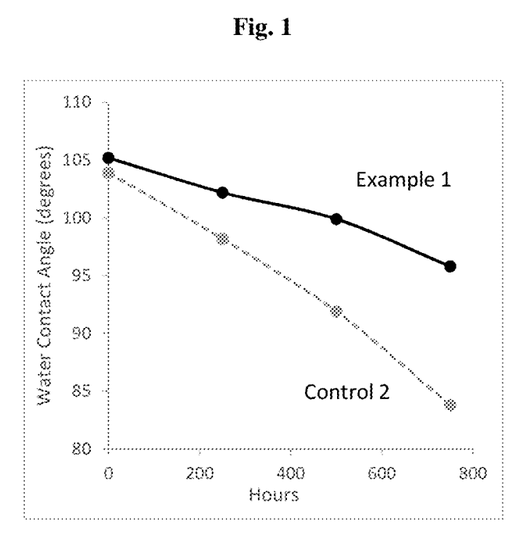
FIG. 1 is a graph illustrating water contact angle retention of coated substrates of the present invention compared to a control after accelerated QUV 340 testing (permanent exposure with a 340 nm filter to simulate natural light conditions—SAE J2020 (2003) with an irradiance of 0.66 W/m2).
Figure 2:
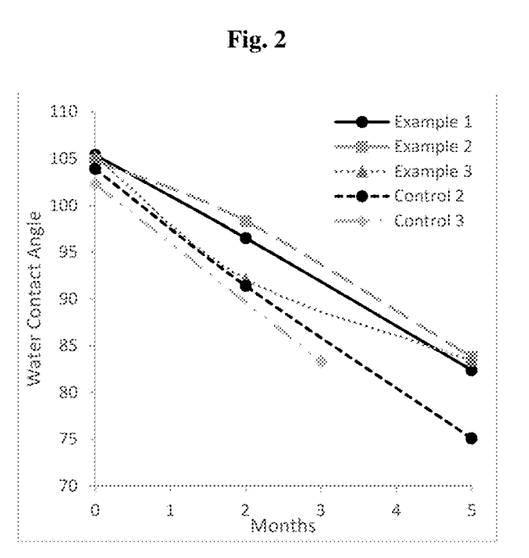
FIG. 2 is a graph illustrating water contact angle retention of coated substrates of the present invention compared to various controls after outdoor field exposure at Sunrise, Fla.

Water contact angle retention after a) accelerated QUV 340 testing (permanent exposure with a 340 nm filter to simulate natural light conditions—SAE J2020 (2003) with an irradiance of 0.66 W/m2) and b) outdoor field exposure at Sunrise, Fla., are illustrated in FIGS. 1 and 2, respectively. The trends evidence the improved retention of hydrophobic properties for the compositions of the present invention that include a hydrophobic film-forming polymer distributed throughout the coating layer in addition to a hydrophobic polymer with a greater concentration at the coating surface.

Figure 3:
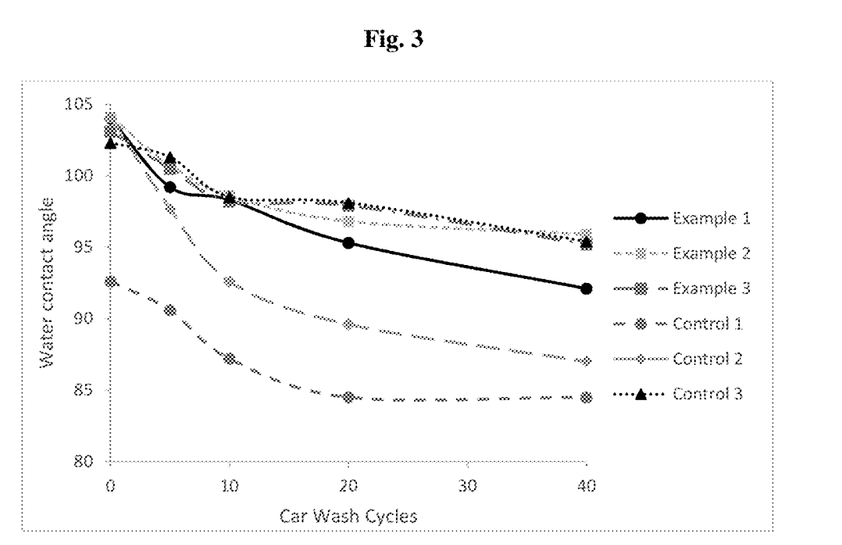
FIG. 3 is a graph illustrating water contact angle retention of coated substrates of the present invention compared to various controls after harsh abrasion under the Amtec-Kistler Car Wash Test DIN 55668, run at 5, 10, 20, and 40 cycles.

Water contact angle retention after harsh abrasion under the Amtec-Kistler Car Wash Test DIN 55668, run at 5, 10, 20, and 40 cycles, evidencing the improved retention of hydrophobic properties for the materials including the bulk-type hydrophobic polymers (homogenous distribution of hydrophobic material), is illustrated in FIG. 3.

The extended retention of dirt mitigation properties of the compositions of the present invention compared to conventional compositions is due to a more homogenous distribution of hydrophobic material throughout the clearcoat, a property that is not possible with the sole use of traditional additive-type hydrophobic materials that are loaded at low concentrations (<10% final solids). This observation was corroborated by the use of Laser-Induced Breakdown Spectroscopy (LIBS) which is able to detect chemical species at different depths of the clearcoat, as depicted in TABLE 4. LIBS uses pulses of a laser to degrade and atomize the sample and then perform atomic emissions spectroscopy, with each consecutive pulse penetrating down deeper into the sample of study. Using this technique for analysis of silicon (from PDMS-based materials) as a function of the number of laser pulses (i.e. clearcoat depth), and as can be seen in TABLE 4, the hydrophobic clearcoat without the first hydrophobic polyol and with the additive-type second hydrophobic polymer only (Control 2) demonstrates a significant amount of silicon only at regions of the clearcoat closest to the air interface, while the coating in Examples 1-2 which include both a first and second hydrophobic polymer demonstrates a homogeneous distribution of hydrophobic material at different clearcoat depths (before the signal spikes upon removing all the clearcoat and reaching the basecoat below). The use of silicon or fluorene-based systems behaved similarly (with a more homogeneous distribution of functionality throughout the bulk of the clearcoat), all of them significantly above the baseline of a comparative non-hydrophobic clearcoat.

TABLE 4

| Integrated Intensity | Pulse 1 | Pulse 5 | Pulse 10 | Last pulse before basecoat |
| --- | --- | --- | --- | --- |
| Example 1 | 970 | 1450 | 1520 | 1810 |
| Example 2 | 970 | 1260 | 1370 | 1300 |
| Control 1 | 410 | 420 | 450 | 440 |
| Control 2 | 550 | 1010 | 590 | 460 |

LIBS-based depth profiling of silicon for different formula examples.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:
1. A curable film-forming composition comprising:
   (a) a first film-forming polymer having reactive functional groups and prepared from a reaction mixture comprising a hydrophobic monomer present in the reaction mixture in an amount of 4 to 15 percent by weight, based on the total weight of monomers in the reaction mixture, wherein the hydrophobic monomer in the reaction mixture used to prepare the first film-forming polymer (a) is selected from at least one of a siloxane, 2,2,3,3,4,4,5,5,6,6,7,7-Dodecafluoroheptyl(meth)acrylate, 3,3,4,4,5,5,6,6,7,7,8,8,9,9,10,10,11,11,12,12,12-Heneicosafluorododecyl (meth)acrylate, 3,3,4,4,5,5,6,6,7,7,8,8,9,9,10,10,10-Heptadecafluorodecyl (meth)acrylate, 2,2,3,3,4,4,4-Heptafluorobutyl (meth)acrylate, 2,2,3,4,4,4-Hexafluorobutyl (meth)acrylate, 1,1,1,3,3,3-Hexafluoroisopropyl (meth)acrylate, 2,2,3,3,4,4,5,5-Octafluoropentyl (meth)acrylate, 2,2,3,3,3-Pentafluoropropyl (meth)acrylate, 1H,1H,2H,2H-Perfluorodecyl (meth)acrylate, 2,2,3,3-Tetrafluoropropyl (meth)acrylate, 3,3,4,4,5,5,6,6,7,7,8,8-Tridecafluorooctyl (meth)acrylate, 2,2,2-Trifluoroethyl (meth)acrylate, and 2-[(1',1',1'-Trifluoro-2'-(trifluoromethyl)-2'-hydroxy)propyl]-3-norbornyl (meth)acrylate, and wherein the first film-forming polymer (a) is present in the curable film-forming composition in an amount of 20 to 40 percent by weight, based on the total weight of resin solids in the curable film-forming composition;
   (b) a second film-forming polymer different from the first film-forming polymer (a) and prepared from a reaction mixture comprising at least one hydrophobic monomer, wherein the hydrophobic monomer in the reaction mixture used to prepare the second film-forming polymer (b) comprises a siloxane and wherein the second film-forming polymer (b) is present in the curable film-forming composition in an amount of 0.5 to 15 percent by weight, based on the total weight of resin solids in the curable film-forming composition; and
   (c) a curing agent comprising functional groups reactive with the reactive functional groups in (a); wherein the second film-forming polymer (b) is more hydrophobic than the first film-forming polymer (a), and wherein upon application of the curable film-forming composition to a substrate to form a coating layer, the first film-forming polymer (a) is distributed throughout the coating layer, and a concentration of the second film-forming polymer (b) is greater within a surface region of the coating layer than a concentration of the second film-forming polymer (b) within a bulk region of the coating layer.

2. The curable film-forming composition of claim 1, wherein the second film-forming polymer (b) comprises an acrylic polymer and the reaction mixture used to prepare the second film-forming polymer (b) further comprises a monomer having a functional group reactive with the functional groups on the curing agent (c).

3. The curable film-forming composition of claim 2, wherein hydrophobic monomer in the reaction mixture used to prepare the second film-forming polymer (b) is present in the reaction mixture in an amount of 15 percent by weight to 60 percent by weight, based on the total weight of monomers in the reaction mixture.

4. The curable film-forming composition of claim 1, wherein the curing agent (c) comprises a polyisocyanate.

5. The curable film-forming composition of claim 1, further comprising (d) an additional film-forming resin component that (i) is different from the first and second film-forming polymers (a) and (b); and (ii) has functional groups that are reactive with at least one other component of the curable film-forming composition.

6. The curable film-forming composition of claim 5, wherein the additional film-forming resin component (d) comprises an acrylic and/or polyester polyol and an aminoplast.

7. A coated substrate comprising the curable film-forming composition of claim 1 applied to at least one surface of the substrate.

8. A coated substrate comprising:
A) a pigmented, curable film-forming composition applied to at least one surface of the substrate to form a base coated substrate, and
B) a transparent, curable film-forming composition applied to at least one surface of the base coated substrate, wherein the transparent, curable film-forming composition is prepared from the curable film-forming composition of claim 1.

9. The coated substrate of claim 8, wherein the substrate comprises a component of a vehicle.

10. The coated substrate of claim 8, wherein the second film-forming polymer (b) comprises an acrylic polymer and wherein the reaction mixture used to prepare the second film-forming polymer (b) further comprises a monomer having a functional group reactive with the functional groups on the curing agent (c), and wherein the hydrophobic monomer in the reaction mixture used to prepare the second film-forming polymer (b) is present in the reaction mixture in an amount of 15 percent by weight to 60 percent by weight, based on the total weight of monomers in the reaction mixture.

11. A method of mitigating dirt build-up on a substrate, comprising:
(1) applying a first coating comprising a pigmented, curable film-forming composition to at least a portion of the substrate to form a base coated substrate;
(2) applying a transparent, curable film-forming composition to at least a portion of the base coated substrate formed in step (1) prior to substantially curing the first coating to form a multi-layer coated substrate, wherein the transparent, curable film-forming composition is prepared from the curable film-forming composition of claim 1; and
(3) heating the multi-layer coated substrate formed in step (2) to a temperature and for a time sufficient to cure all the film-forming compositions.

12. The method of claim 11, wherein the substrate comprises a component of a vehicle.

13. The method of claim 11, wherein the second film-forming polymer (b) comprises an acrylic polymer and wherein the reaction mixture used to prepare the second film-forming polymer (b) further comprises a monomer having a functional group reactive with the functional groups on the curing agent (c), and wherein the hydrophobic monomer in the reaction mixture used to prepare the second film-forming polymer (b) is present in the reaction mixture in an amount of 15 percent by weight to 60 percent by weight, based on the total weight of monomers in the reaction mixture.

14. The curable film-forming composition of claim 1, wherein the curing agent (c) is selected from one or more of toluene diisocyanate, 4,4'-methylene-bis(cyclohexyl isocyanate), isophorone diisocyanate, 2,2,4-trimethyl hexamethylene diisocyanate, 2,4,4-trimethyl hexamethylene diisocyanate, 1,6-hexamethylene diisocyanate, meta-xylylene diisocyanate, tetramethyl xylylene diisocyanate, 4,4'-diphenylmethylene diisocyanate, a biuret of any of the aforementioned diisocyanates, a trimer of isophorone diisocyanate, a trimer of 1,6-hexamethylene diisocyanate, triisocyanato nonane, triphenylmethane triisocyanate, 1,3,5-benzene triisocyanate, 2,4,6-toluene triisocyanate, a reaction product of trimethylol and tetramethyl xylene diisocyanate, and an aminoplast resin.

* * * * *